May 10, 1932.  A. PFRETZSCHNER  1,857,658

APPARATUS FOR STUNNING ANIMALS TO BE SLAUGHTERED

Filed Jan. 29, 1930

Inventor:
Adolf Pfretzschner
by
Attorney.

Patented May 10, 1932

1,857,658

UNITED STATES PATENT OFFICE

ADOLF PFRETZSCHNER, OF PASING, NEAR MUNICH, GERMANY

APPARATUS FOR STUNNING ANIMALS TO BE SLAUGHTERED

Application filed January 29, 1930, Serial No. 424,386, and in Germany February 6, 1929.

This invention relates to an apparatus for stunning animals to be slaughtered, especially pigs, by means of electric current. It consists in a movable gangway, along which the animals are driven, with movable electric current contacts arranged one after the other, which come to bear consecutively on the back or flanks and on the head or nose of the animal, when it reaches and strikes against the contacts barring the passage in the gangway. The gangway may be composed of an endless band, preferably constituted of links and which runs either horizontally or on an upward incline. In the first instance, if the gangway is horizontal, an upwardly inclined and a downwardly inclined bridge are arranged at the front and rear ends of the gangway, and in the second case, when the gangway is inclined, a suitably raised table is provided at the rear end of the gangway, onto which the stunned animal is removed from the gangway. When continuous current is used, two pole contacts are provided and, when three phase current is employed three pole contacts are utilized, in the latter instance so that two poles bear one on each flank of the animal's body and the third on its head.

Several embodiments of the invention are illustrated by way of example in the accompanying drawings in which:—

Figure 1:
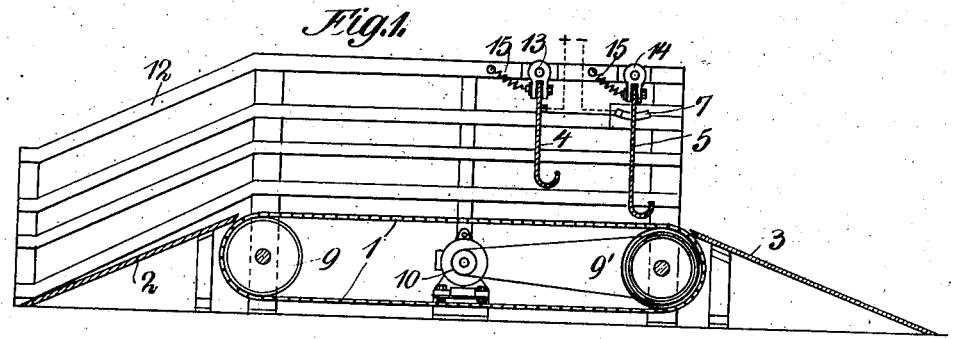
Fig. 1 shows the apparatus in side elevation.

An endless band 1 of suitable width, preferably composed of links of material capable of carrying the weight of the animal, runs over two or more drums 9, 9' and is intended for conveying the animal over the distance between the drums. If the drums are arranged above the floor, a rising bridge 2 leads up to the band and a downwardly inclined bridge 3 is provided at the end of the band, down which the stunned animal slides. The band 1 runs horizontally over the drums and is driven by hand by means of a crank or by means of a motor 10. If it is preferable to convey the stunned animal onto a table, the band 1 is upwardly inclined one of the drums 11 being for instance of greater diameter than the other drum 11. The table 6 is arranged at the end of the band. When the band stands free, a railing 12 is arranged at each side thereof. Movable contacts are arranged consecutively above the band 1 so that the animal on the band and transported therewith must strike against same. These contacts are mounted on suitable supports, for example on the railings 12, oscillatable against the action of springs 15. They consist preferably of flaps, which bar the space above the band 1 and between the railings 12.

Figure 2:
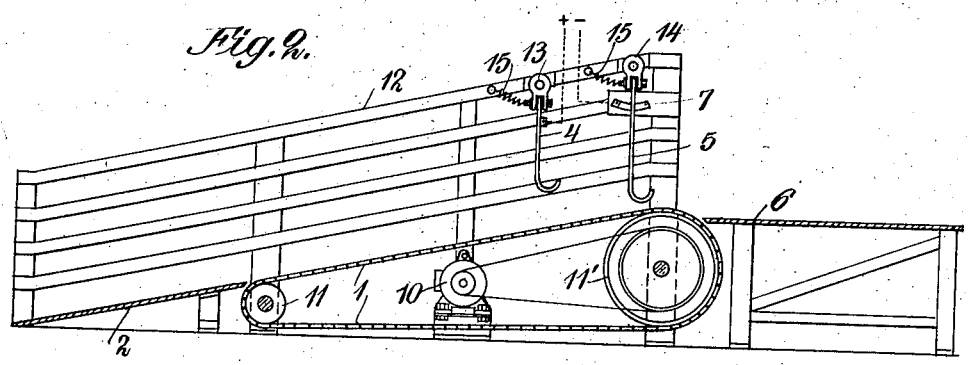
Fig. 2 is a modification of Fig. 1, also in side elevation.

According to the constructions shown in Figs. 1 and 2, the first encountered contact flap 4, which is oscillatably mounted on the railings around the hinges 13, is shorter than the following contact flap 5, oscillatable on the hinges 14. Both contact flaps are held in vertical oscillatable position by their springs 15, and each contact flap is connected to one pole of the electric circuit. The shorter flap 4 slides over the head onto the back of the animal, the nose of the animal striking against the second contact 5. The animal thus closes the circuit from its nose through its brain to its back and is therefore stunned.

Figure 3:
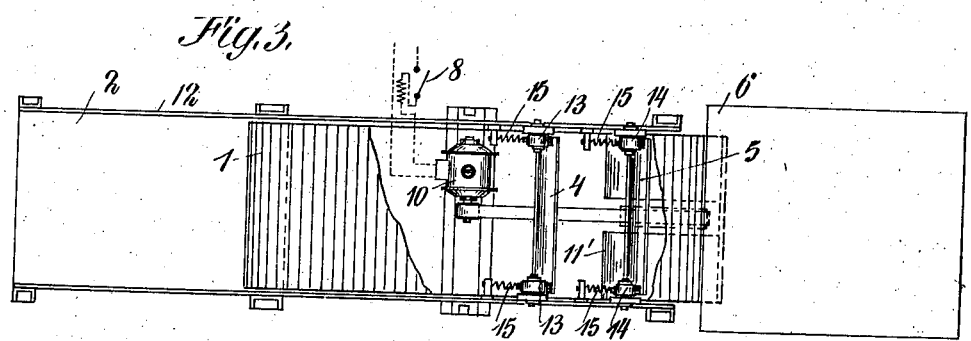
Fig. 3 is a top plan view of Fig. 2.

In order to limit the duration of the closing of the circuit, one of the contacts may be connected to a circuit breaker, for example a sliding contact 7, which interrupts the current when the contact flap 5 has been oscillated through a certain angle. An automatic cut out switch 8 (see Fig. 3) may be connected to the motor circuit and interrupt this motor circuit in the case of overloading. Such overloading may be produced, if the animal becomes stubborn and stands transversely to the band, jammed between the railings.

Figure 5:
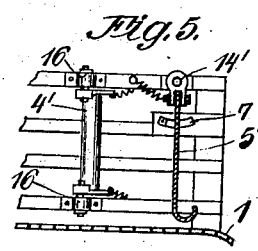
Fig. 5 is a side elevation of Fig. 4.
Figure 4:
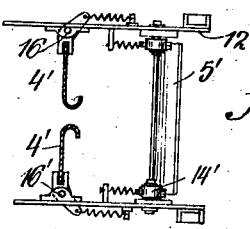
Fig. 4 shows a different arrangement of the current contacts in top plan view.

According to the arrangement of contacts shown in plan view and side elevation respectively in Figs. 4 and 5, the first encountered contact is composed of two parts 4', each swivelably mounted on a vertical axle 16, 16' respectively and opening like the wings of a swing door. Both contacts 4' are homopolar and bear against the two flanks of the animal's body. The next following contact 5' is oscillatable on a horizontal axle 14' like the flap 5 shown in Fig. 1.

When employing three phase current, each of the flaps shown in Fig. 4 is connected to a separate pole and the flap 5' to the third pole. As the head of the animal engages between these flaps 4' a current impulse passes transversely through the brains, and instantaneously hereafter the nose of the animal touches the flap 5'. In this instance the closing of the circuit is effected from the nose of the animal through the brain to the two flank contacts. Thus the reliability of the circuit closing is increased, as, if one pole contact fails through bearing badly or through the bristles or wool of the animal, a second circuit closure is available, whereas the double circuit closure effects a more intensive stunning of the animal. In order to prevent the failure of the circuit closing, owing to the insulating bristles or fleece of the animal in the case of pigs and sheep respectively, contacts made of moisture absorbing material, for example felt, are used which are saturated with moisture. For the continual moistening of these contacts they can be connected with liquid containers. It is a known fact that, even in the case of good conducting contacts the closure of the circuit does not have a sufficient stunning effect on the animal and that the maximum penetrating force of the current occurs, when the circuit is being opened or closed. In order to duplicate this method of operation, a rotary switch with a number of consecutive contact breakers may be provided. This switch may be operated by hand or by a suitable driving mechanism, so that it switches the current in and out several times during the passage of an animal through the contact flaps. Owing to this repeated closing of the circuit the insulating resistance between the contacts and the body of the animal are more easily bridged.

The contact flaps and the travelling band may be of different construction from that shown in the drawings without departing from the scope of the invention.

I claim:—

1. In an apparatus for stunning animals to be slaughtered the combination of a travelling path adapted to convey the animals to be slaughtered, railings at either side of and along said travelling path, electric contacts oscillatably arranged above said travelling path and adapted to bear consecutively on the body of the animal.

2. An apparatus as specified in claim 1, in which the contacts are composed of spring-controlled swinging flaps.

3. In an apparatus for stunning animals to be slaughtered the combination of a travelling path adapted to convey the animals to be slaughtered, two electric contacts oscillatably arranged consecutively above said travelling path, one of said contacts extending onto the back of the animal and the other of said contacts onto the nose of said animal.

4. In an apparatus for stunning animals to be slaughtered the combination of a travelling path adapted to convey the animals to be slaughtered, electric contacts, movably arranged consecutively above said travelling path one of said contacts horizontally oscillatable and adapted to bear laterally against the body of the animal the other of said contacts vertically oscillatable and adapted to bear against the head of the animal.

5. In an apparatus for stunning animals to be slaughtered the combination of a travelling path adapted to convey said animals to be slaughtered, electric contacts movably arranged above said travelling path and adapted to bear consecutively against the body of said animal, a circuit breaker arranged on one of said contacts and actuated by said contact on turning.

In testimony whereof I affix my signature.

ADOLF PFRETZSCHNER.